United States Patent
Ogawa et al.

(10) Patent No.: US 11,770,690 B2
(45) Date of Patent: Sep. 26, 2023

(54) CENTER DEVICE, DATA COMMUNICATION SYSTEM, AND DATA COMMUNICATION PROGRAM PRODUCT

(71) Applicant: DENSO CORPORATION, Kariya (JP)

(72) Inventors: Tomoya Ogawa, Kariya (JP); Yoshitaka Ozaki, Kariya (JP); Yasufumi Iino, Kariya (JP); Haruhiko Kakitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/219,323

(22) Filed: Mar. 31, 2021

(65) Prior Publication Data

US 2021/0219115 A1 Jul. 15, 2021

Related U.S. Application Data

(63) Continuation of application No. PCT/JP2019/035522, filed on Sep. 10, 2019.

(30) Foreign Application Priority Data

Oct. 3, 2018 (JP) .................................. 2018-188259

(51) Int. Cl.
*H04W 4/46* (2018.01)
*H04W 4/38* (2018.01)
(Continued)

(52) U.S. Cl.
CPC .............. *H04W 4/46* (2018.02); *G07C 5/008* (2013.01); *H04W 4/38* (2018.02); *H04W 4/48* (2018.02); *H04W 72/0453* (2013.01)

(58) Field of Classification Search
CPC ........... H04W 4/70; H04W 4/80; H04W 4/40; H04W 84/18; H04W 4/38; H04W 4/029; H04W 52/02; H04W 40/248
See application file for complete search history.

(56) References Cited

U.S. PATENT DOCUMENTS 7,227,475 B1 * 6/2007 Provenzano ............. G08G 1/20
340/995.12
2014/0141820 A1 5/2014 Saito
(Continued)

FOREIGN PATENT DOCUMENTS

CN 207419305 * 5/2018
JP 2006047112 A 2/2006
(Continued)

OTHER PUBLICATIONS

Masanobu Fujioka, "5G, IoT trends and MVNO possibilities" Okinawa ICT forum 2017, Jul. 6, 2017, pp. 21-31.

*Primary Examiner* — Khalid W Shaheed
(74) *Attorney, Agent, or Firm* — Harness, Dickey & Pierce, P.L.C.

(57) ABSTRACT

The center device includes: a first wireless communication unit configured to wirelessly communicate with a vehicle using a first communication method within a first communication range; a second wireless communication unit configured to wirelessly communicate with the vehicle using a second communication method having a higher communication speed than that of the first communication method within a second communication range which is smaller than the first communication range; a reception control unit configured to control a reception of vehicle information from the vehicle to the first wireless communication unit; and a distribution control unit configured to control distribution of content data from the second wireless communication unit to the vehicle according to the vehicle information.

12 Claims, 10 Drawing Sheets

(51) Int. Cl.
*H04W 4/48* (2018.01)
*G07C 5/00* (2006.01)
*H04W 72/0453* (2023.01)

(56) References Cited

U.S. PATENT DOCUMENTS

| | | |
|---|---|---|
| 2017/0163559 A1 | 6/2017 | Oshima |
| 2018/0042039 A1 | 2/2018 | Senba et al. |
| 2018/0196660 A1* | 7/2018 | Rivas Silva ........... H04H 20/62 |
| 2018/0213420 A1 | 7/2018 | Simsek |

FOREIGN PATENT DOCUMENTS

| | | |
|---|---|---|
| JP | 2010078533 A | 4/2010 |
| JP | 2010191786 A | 9/2010 |
| JP | 2012164210 A | 8/2012 |
| JP | 2014103608 A | 6/2014 |
| JP | 2016-208418 A | 12/2016 |
| JP | 2016206715 A | 12/2016 |
| JP | 2017102802 A | 6/2017 |
| JP | 2018022391 A | 2/2018 |

* cited by examiner

FIG. 2

CONTENT DATA

| FILE NAME | DATA BODY |
|---|---|
| ECU_A_update1 | DATA BODY (BINARY) |
| ECU_B_update1 | DATA BODY (BINARY) |
| ECU_C_update1 | DATA BODY (BINARY) |
| Map_1 | DATA BODY (BINARY) |
| Map_2 | DATA BODY (BINARY) |
| ⋮ | ⋮ |

FIG. 3

VEHICLE REGISTRATION INFO

| VIN | TELEPHONE NUMBER |
|---|---|
| ABC100 | 0901111XXXX |
| ABC101 | 0803333XXXX |
| ABC102 | 0905555XXXX |
| ABC103 | 0807777XXXX |
| ⋮ | ⋮ |

FIG. 4

| VEHICLE COLLECTION INFO | | | | | | | |
|---|---|---|---|---|---|---|---|
| VIN | TIME | POSITION INFO | VEHICLE CONDITION | | | VEHICLE BEHAVIOR | |
| | | | IG | VEHICLE SPEED | ... | ACCELERATOR | BRAKE | ... |
| ABC100 | 2018:8:30 12:15:01 | LATITUDE: XX DEGREES XX MINUTES XX SECONDS LONGITUDE: XX DEGREES XX MINUTES XX SECONDS | ON | 36 | ... | 37 | ○ | ... |
| ABC100 | 2018:8:30 12:25:01 | LATITUDE: XX DEGREES XX MINUTES XX SECONDS LONGITUDE: XX DEGREES XX MINUTES XX SECONDS | OFF | ○ | ... | ○ | ○ | ... |
| ABC101 | 2018:8:30 12:45:01 | LATITUDE: XX DEGREES XX MINUTES XX SECONDS LONGITUDE: XX DEGREES XX MINUTES XX SECONDS | OFF | ○ | ... | ○ | ○ | ... |
| ... | ... | ... | ... | ... | ... | ... | ... | ... |

FIG. 5

VEHICLE IMAGE DATA

| VIN | TIME | DATA BODY |
|---|---|---|
| ABC100 | 2018:8:30 12:16:01 | DATA BODY (BINARY) |
| ABC100 | 2018:8:30 12:26:01 | DATA BODY (BINARY) |
| ⋮ | ⋮ | ⋮ |

FIG. 6

| COMMUNICATION METHOD | DESCRIPTION | | DATA | |
|---|---|---|---|---|
| | USAGE POLICY | UPSTREAM | UPSTREAM | DOWNSTREAM |
| LPWA | • SMALL SIZE DATA (TRIGGER, FLAG, SIGNAL VALUE)<br>• PERIODIC | • VIN<br>• POSITION INFO<br>• VEHICLE CONDITION<br>　-IG (TRAVELLING/STOP)<br>　-VEHICLE SPEED<br>　-BATTERY REMAINING AMOUNT<br>　-SEAT POSITION<br>　-AIR CONDITIONING SETTING<br>• VEHICLE BEHAVIOR<br>　-ACCELERATOR<br>　-BRAKE<br>　-STEERING<br>　-AUTOMATIC BRAKE<br>　-ACC | | • EVENT NOTIFICATION<br>　-CAMPAIGN AVAILABILITY<br>　-CONTENT DATA AVAILABILITY<br>• INSTRUCTION TO VEHICLE<br>　-CHANGE OF COLLECTION FREQUENCY |
| LTE | • LARGE SIZE DATA (REPROGRAMMING DATA, MAP DATA, VEHICLE IMAGE DATA)<br>• ON DEMAND | • VEHICLE IMAGE DATA | | • CONTENT DATA<br>-REPROGRAMMING DATA<br>-MAP DATA |

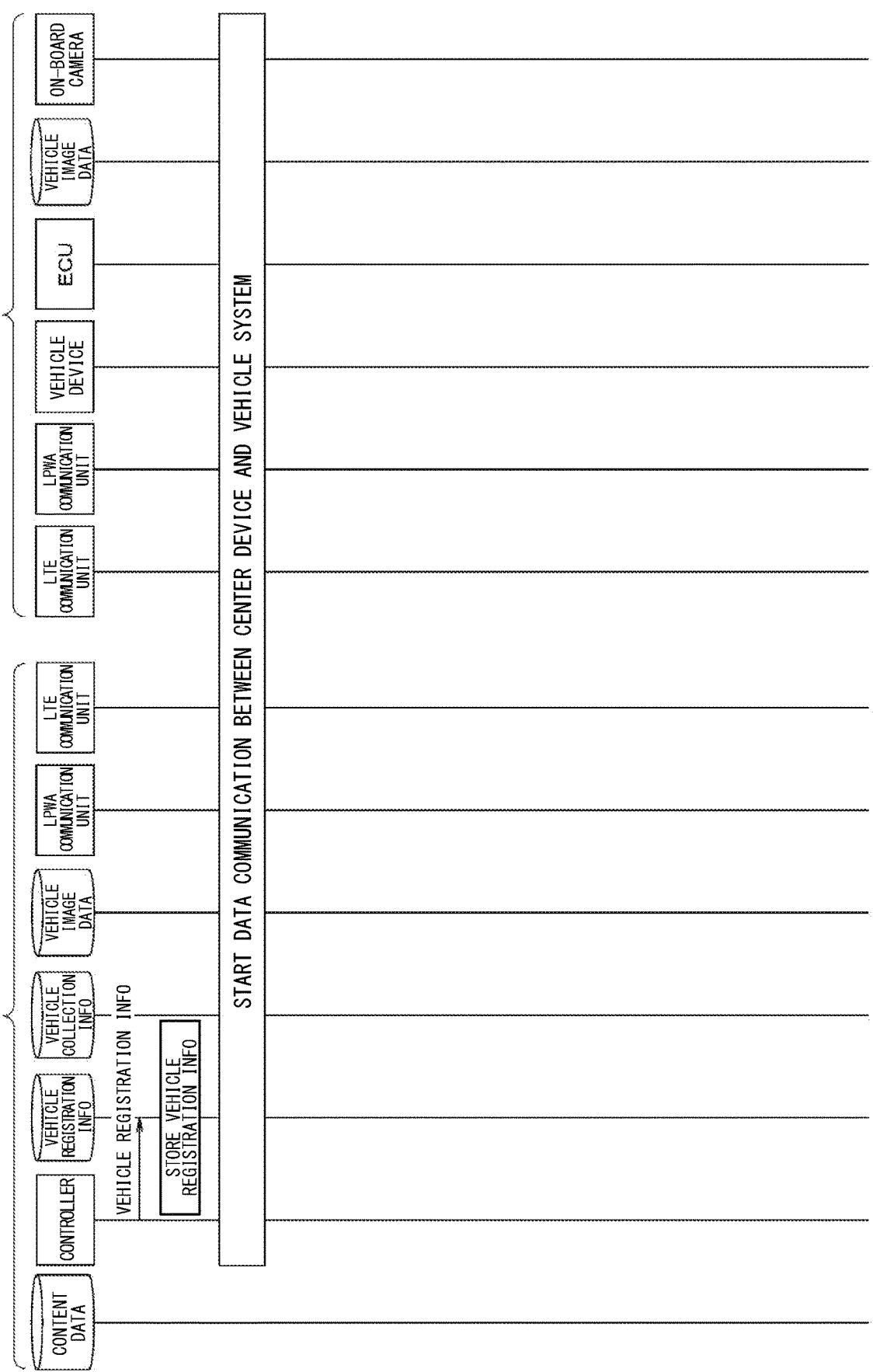

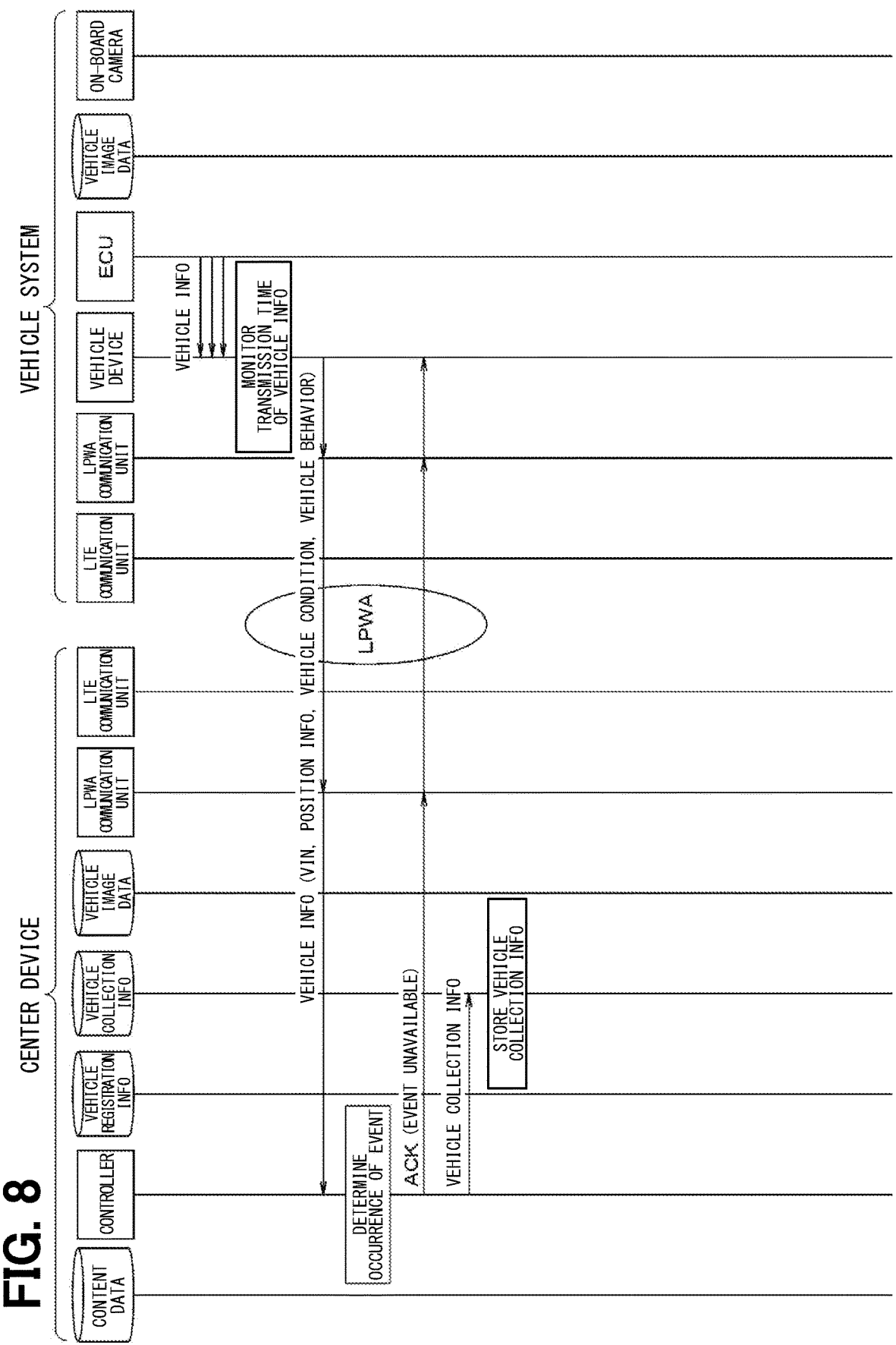

CENTER DEVICE, DATA COMMUNICATION SYSTEM, AND DATA COMMUNICATION PROGRAM PRODUCT

CROSS REFERENCE TO RELATED APPLICATIONS

The present application is a continuation application of International Patent Application No. PCT/JP2019/035522 filed on Sep. 10, 2019, which designated the U.S. and claims the benefit of priority from Japanese Patent Application No. 2018-188259 filed on Oct. 3, 2018. The entire disclosures of all of the above applications are incorporated herein by reference.

TECHNICAL FIELD

The present disclosure relates to a center device, a data communication system, and a data communication program product.

BACKGROUND ART

There has been known a center device which wirelessly distributes content data to vehicles using technology of connected cars.

SUMMARY

A center device: wirelessly communicate with a vehicle using a first communication method within a first communication range; wirelessly communicate with the vehicle using a second communication method within a second communication range which is smaller than the first communication range, the second communication method having a communication speed higher than a communication speed of the first communication method; control a reception of vehicle information from the vehicle to the center device via the first communication method, control a distribution of content data from the center device to the vehicle via the second communication method in accordance with the received vehicle information.

BRIEF DESCRIPTION OF DRAWINGS

The above and other objects, features and advantages of the present disclosure will become more apparent from the following detailed description made with reference to the accompanying drawings. In the drawings:

FIG. 2 is a diagram showing content data;

FIG. 3 is a diagram showing vehicle registration information;

FIG. 4 is a diagram showing vehicle collection information;

FIG. 5 is a diagram showing vehicle image data;

FIG. 6 is a diagram showing a communication method and a data type for each communication direction;

FIG. 7 is a sequence diagram of an initial registration;

FIG. 8 is a sequence diagram of vehicle information collection in a normal state;

DETAILED DESCRIPTION

Figure 1:
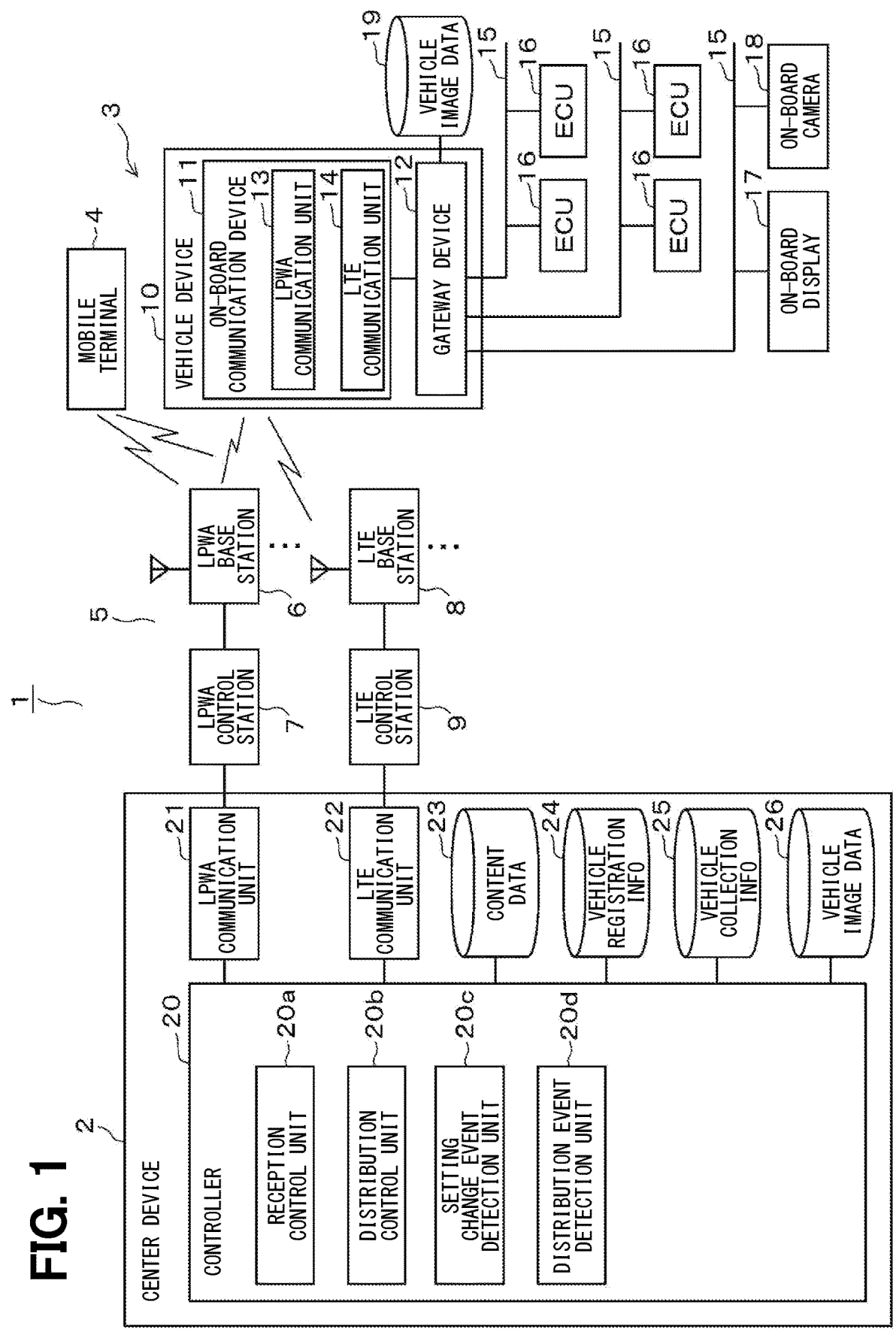
FIG. 1 is a diagram showing a configuration according to an embodiment of the present disclosure.

In recent years, with the development of communication network technologies, technologies related to connected cars are developing. Using the technology of connected cars, the center device can wirelessly distribute content data to the vehicle. For example, there has been known a configuration in which a center device wirelessly distributes, to a vehicle, reprogramming data for updating an application program of an electronic control device (hereinafter referred to as ECU, which is short for electronic control unit) and the ECU reprograms an application program with the distributed reprogramming data.

In a configuration where the center device distributes content data, such as reprogramming data to the vehicle, the center device needs to manage a state and behavior of each vehicle one by one in order to appropriately distribute the content data. That is, in the center device, it is necessary to periodically receive and collect, from the vehicle, vehicle information indicating the vehicle condition, vehicle behavior, or the like. In a case where there is a large number of types of vehicle information to be collected from the vehicle or a large number of target vehicles for which vehicle information needs to be collected, an amount of vehicle information data collected by the center device becomes large and the center device may have a trouble in processing of the large amount of data which cause concentration of processing load in the center device. Usually, the content data distributed from the center device has a large data size. In a case where a communication network has a low communication speed, a bandwidth of the communication line may be occupied for a long period of time for the distribution of content data. With consideration of this point, the center device is required to have a mechanism for efficiently collecting vehicle information from the vehicle and efficiently distributing content data to the vehicle.

According to an aspect of the present disclosure, a center device includes: a first wireless communication unit configured to wirelessly communicate with a vehicle using a first communication method within a first communication range; a second wireless communication unit configured to wirelessly communicate with the vehicle using a second communication method within a second communication range which is smaller than the first communication range, the second communication method having a communication speed higher than a communication speed of the first communication method; a reception control unit configured to control a reception of vehicle information from the vehicle to the first wireless communication unit; and a distribution control unit configured to control distribution of content data from the second wireless communication unit to the vehicle in accordance with the received vehicle information.

According to another aspect of the present disclosure, a data communication system includes the above-described center device, and a vehicle device that transmits vehicle information to the center device and receives the content data from the center device.

According to another aspect of the present disclosure, a data communication program product is stored in a tangible non-transitory computer-readable storage medium and includes instructions to be executed by a center device. The instructions include: receiving vehicle information from a vehicle by a first wireless communication unit, the first wireless communication unit performing a wireless communication with the vehicle by a first communication method within a first communication range; and distributing content data to the vehicle by a second wireless communication unit, the second wireless communication unit performing a wireless communication, at a higher communication speed than a communication speed of the first communication method, with the vehicle by a second communication method within a second communication range which is smaller than the first communication range.

Vehicle information is received from the vehicle by the first communication method, which has a relatively slow communication speed but a relatively wide communication range. The content data is distributed to the vehicle by the second communication method, which has a relatively narrow communication range but a relatively high communication speed. The vehicle information requires frequent communication over a wide area in order to keep the latest vehicle information. By collecting the vehicle information by the first communication method, it is possible to keep the latest vehicle information. The content data requires large communication capacity in order to avoid increase of communication time period. By distributing the content data by the second communication method, the content data can be distributed in a short time. With this configuration, vehicle information can be efficiently collected from the vehicle, and the content data suitable for the latest vehicle information can be efficiently distributed to the vehicle.

The following will describe an embodiment of the present disclosure with reference to the accompanying drawings. A data communication system includes a center device which wirelessly distributes content data to a vehicle. The content data distributed from the center device to the vehicle includes reprogramming data for updating an application program related to vehicle control and diagnosis of an ECU mounted on the vehicle, map data stored in the ECU, or the like. Usually, such content data has a large amount of data.

As shown in FIG. 1, the data communication system 1 includes the center device 2, a vehicle system 3 mounted on a vehicle and used by a user, and a mobile terminal 4 carried by the user. The mobile terminal 4 may be provided by a smartphone or a tablet having a web browser. The center device 2, the vehicle system 3, and the mobile terminal 4 are configured to be communicable with one another via a communication network 5. Each of the center device 2, the vehicle system 3, and the mobile terminal 4 has a one-to-multiple relationship. For example, the center device 2 can perform data communication with multiple vehicle systems 3 and multiple mobile terminals 4.

The communication network 5 may include a communication network compliant with LPWA (Low Power Wide Area) communication method (corresponding to first communication method) and a communication network compliant with LTE (Long Term Evolution) communication method (corresponding to second communication method). The LPWA includes cellular LPWA and non-cellular LPWA. The cellular LPWA is under standardization process by 3GPP (Third Generation Partnership Project). The cellular LPWA uses an approved frequency band. The cellular LPWA includes NB-IoT, Cat-M1 or the like. The non-cellular LPWA is under standardization process by IEEE (Institute of Electrical and Electronics Engineers) and alliance. The non-cellular LPWA uses an ISM (Industry Science Medical) frequency band which is a frequency assigned for general use in the industrial, science, and medical fields. The non-cellular LPWA include SIGFOX, LoRa, Wi-FiHaLow or the like. In the present embodiment, the LPWA communication network conforms to the cellular LPWA communication method.

The communication network 5 includes multiple LPWA base stations 6 and a LPWA control station 7 that controls the multiple LPWA base stations 6. The communication network 5 also includes multiple LTE base stations 8 and a LTE control station 9 that controls the multiple LTE base stations 8. The LPWA control station 7 monitors communication state between the LPWA base stations 6 and the vehicle, and determines whether a current position of the vehicle is within a communication range of the LPWA communication or out of the communication range for each vehicle ID. The LTE control station 9 monitors communication state between the LTE base stations 8 and the vehicle, and determines whether the current position of the vehicle is within a communication range of the LTE communication or out of the communication range for each vehicle ID.

The communication network compliant with the LPWA communication method has characteristics that the communication range is wider and the power consumption is lower, but a communication speed is lower compared with the communication range, the power consumption, and a communication speed of the communication network compliant with the LTE communication method. The communication network compliant with the LTE communication method has the higher communication speed than that of the communication network compliant with the LPWA communication method, but the communication network compliant with the LTE communication method has the smaller communication rage than that of the communication network compliant with the LPWA communication method.

The vehicle system 3 includes a vehicle device 10. The vehicle device 10 includes an on-board communication device 11 and a gateway device 12, and the on-board communication device 11 and the gateway device 12 are connected so as to be capable of performing data communication. The on-board communication device 11 includes an LPWA communication unit 13 and an LTE communication unit 14, and performs data communication with the center device 2 via the communication network 5. When the on-board communication device 11 downloads the content data from the center device 2, the on-board communication device 11 transfers the downloaded content data to the gateway device 12.

The gateway device 12 has a data relay function. In response to the content data being transferred from the on-board communication device 11, the gateway device distributes the received content data to the ECU. When the ECU receives the content data from the gateway device 12, the ECU stores the received content data in a flash memory. By writing the content data, the ECU can repairs bug of the application program, improve the function of the application program, or update the map data used in the application program.

Various ECUs 16, an on-board display 17, and an on-board camera 18 are connected to the gateway device 12 via a bus 15. The bus 15 is, for example, a body network bus, a traveling network bus, a multimedia network bus, or the like. The ECUs 16 connected to the body network bus include, for example, a door ECU for controlling locking/unlocking of doors, a meter ECU for controlling a meter display, an air conditioning ECU for controlling an air conditioner, a window ECU for controlling opening/closing of windows. The ECUs 16 connected to the traveling network bus include, for example, an engine ECU for controlling an engine, a brake ECU for controlling braking operation, an ECT ECU for controlling automatic transmission operation, a power steering ECU for controlling power steering operation. The ECUs 16 connected to the multimedia network bus include, for example, a navigation ECU for controlling a navigation system, an ETC ECU for controlling an electronic toll collection system (ETC: electronic toll collection system, ETC is a registered trademark). The bus 15 may be another type of system bus other than the body network bus, the traveling network bus, and the multimedia network bus. The detailed number of the buses 15 and the detailed number of the ECUs 16 are not limited to the example in the illustrated configuration.

The LPWA communication unit 13 performs a communication compliant with the LPWA communication method (hereinafter, referred to as LPWA communication) with the center device 2 via the communication network 5. The LTE communication unit 14 performs a communication compliant with the LTE communication method (hereinafter, referred to as LTE communication) with the center device 2 via the communication network 5.

The on-board display 17 may be configured to have a navigation function, and displays various contents on display screens. In a case where the user updates the application program of the ECU 16 in the vehicle, the user can input operation while checking various display screens related to the update of the application program on the on-board display 17, and perform the procedure related to the update of the application program. In a case where the user updates the application program of the ECU 16 from outside of the vehicle, the user can input operation while checking various screens related to the update of the application program on the mobile terminal 4, and perform the procedure related to the update of the application program. That is, the user can properly use the on-board display 17 inside the vehicle and use the mobile terminal 4 from outside of the vehicle, and can perform procedure related to the update of the application program.

The on-board camera 18 is, for example, configured to captures a front view of the vehicle, and transmits the captured image as vehicle image data to the vehicle device 10.

The gateway device 12 is connected to a vehicle image data storage 19. The vehicle image data storage 19 temporarily stores the image captured by the on-board camera 18 as the vehicle image data. The on-board communication device 11 monitors a transmission time of the vehicle image data. When determining an arrival of the transmission time of the vehicle image data, for example, a predetermined time elapses or the vehicle travels a predetermined distance from last time transmission of the vehicle image data in a travelling state of the vehicle, the transmission of the vehicle image data is executed. The on-board communication device 11 transmits the vehicle image data stored in the vehicle image data storage 19 to the center device 2 via the communication network 5 together with, for example, the current position of the vehicle. The vehicle image data also has a large amount of data similar to the reprogramming data and the map data.

The center device 2 includes a controller 20, an LPWA communication unit 21 (first wireless communication unit), an LTE communication unit 22 (second wireless communication unit), a content data database 23, a vehicle registration information database 24, a vehicle collection information database 25, and a vehicle image data database 26. In the present embodiment, the databases 23 to 26 are included in the center device 2. Alternatively, the databases 23 to 26 may be disposed outside of the center device 2.

The LPWA communication unit 21 performs LPWA communication with the vehicle system 3 via the communication network 5. The LTE communication unit 22 performs LTE communication with the vehicle system 3 via the communication network 5.

The content data database 23 stores the content data as a form of database. As shown in FIG. 2, the content data may be reprogramming data or map data, and each content data includes a file name and a data body.

The vehicle registration information database 24 stores vehicle registration information as a database. As shown in FIG. 3, each vehicle registration information includes a vehicle identification number (hereinafter referred to as VIN, which is short for vehicle identification number) uniquely assigned to the vehicle and a telephone number of the on-board communication device 11.

The vehicle collection information database 25 stores vehicle collection information as a database. As shown in FIG. 4, the vehicle collection information includes VIN, time stamp of reception of vehicle information as the vehicle collection information or time stamp of storing of vehicle information as the vehicle collection information, position information indicating the current position of the vehicle, a vehicle condition indicating a condition of the vehicle, and a vehicle behavior indicating a behavior of the vehicle. As shown in FIG. 6, the vehicle condition may include an ignition state (travelling/stop), a vehicle speed, a remaining battery amount, a seat position, an air conditioner setting, or the like. As shown in FIG. 6, the vehicle behavior may include an accelerator operation amount, a brake operation amount, a steering operation amount, an automatic brake activation state, an ACC (Adaptive Cruise Control) activation state, or the like.

The vehicle image data database 26 stores the vehicle image data as a database. As shown in FIG. 5, the vehicle image data may include VIN, a time stamp of reception of the vehicle image data or storing of the vehicle image data, and a data body.

The controller 20 includes a microcomputer having a CPU (central processing unit), a ROM (read only memory), a RAM (random access memory), and the like. The controller executes a control program stored in a non-transitory tangible storage medium to perform various processes and controls the operation of the center device 2. The control program executed by the controller 20 includes a data communication program. The controller 20 includes a reception control unit 20a, a distribution control unit 20b, a setting change event detection unit 20c, and a distribution event detection unit 20d.

The reception control unit 20a controls a reception of the vehicle information from the vehicle system 3 to the LPWA communication unit 21. In response to the setting change event detection unit 20c detecting an occurrence of a collection frequency setting change event, the reception control unit 20a receives the vehicle information according to the collection frequency to which the setting change is applied.

The distribution control unit 20b controls the distribution of the content data from the LTE communication unit 22 to the vehicle system 3. In response to the distribution event detection unit 20d detecting an occurrence of a content data distribution event, the distribution control unit 20b distributes the content data according to the detected distribution request.

The data types for each communication method and each communication direction may be set as an example shown in FIG. 6. The LPWA communication communicates small amount of data, and is defined as a periodic communication.

The data having small amount may include a trigger, a flag, a signal value, or the like. The LTE communication communicates large amount of data, and is defined as on-demand communication. The data having large amount may include the reprogramming data, the map data, the vehicle image data, or the like. The upstream information transmitted from the vehicle system 3 to the center device 2 by the LPWA communication may include vehicle information, such as, VIN, position information, vehicle condition, the vehicle behavior, or the like. The downstream information transmitted from the center device 2 to the vehicle system 3 by the LPWA communication may include an event notification and an instruction to the vehicle. The event notification may include availability of reprogramming campaign, availability of content data, or the like. The instruction to the vehicle may include change of the collection frequency. The upstream information transmitted from the vehicle system 3 to the center device 2 by the LTE communication may include vehicle image data. The downstream information transmitted from the center device 2 to the vehicle system 3 by the LTE communication may include the content data.

The following will describe an operation of the above configuration with reference to FIG. 7 to FIG. 11. The following will describe process related to the initial registration, the collection of vehicle information in a normal state, the change of collection frequency setting, the distribution of content data, and the transmission of vehicle image data.

(1) Initial Registration Process

As shown in FIG. 7, after the vehicle is shipped from the factory and handed over to the user, an operator performs the vehicle information registration operation. In the vehicle device 2, the controller 20 stores the information inputted by the operator's registration operation in the vehicle registration information database 24 as the vehicle registration information. After the vehicle registration information is stored in the vehicle registration information database 24, data communication becomes possible between the center device 2 and the vehicle system 3 mounted on the vehicle.

(2) Collecting of Vehicle Information in a Normal State

As shown in FIG. 8, in the vehicle system 3, in response to the vehicle device 10 receiving the vehicle information from the ECU 16, the vehicle device 10 temporarily stores the received vehicle information and determines a transmission time of the vehicle information with reference to a preset transmission cycle. In response to the vehicle device 10 determining that a vehicle information transmission condition is satisfied and the transmission time of the vehicle information has been reached, the vehicle device 10 transmits the temporarily stored vehicle information from the LPWA communication unit 13 to the center device 2 via the communication network 5.

In the center device 2, when the vehicle information transmitted from the vehicle device 10 is received by the LPWA communication unit 21 (vehicle information reception procedure), the controller 20 determines availability of an event related to the VIN included in the received vehicle information. In response to the controller 20 determining no event related to the VIN, the controller 20 sets an event occurrence flag to "NO", and transmits an ACK including "event unavailable" from the LPWA communication unit 21 to the vehicle device 10 via the communication network 5. After the controller 20 completes the transmission of ACK, the controller 20 stores the received vehicle information as the vehicle collection information in the vehicle collection information database 25.

(3) Setting Change of Collection Frequency

Figure 9:
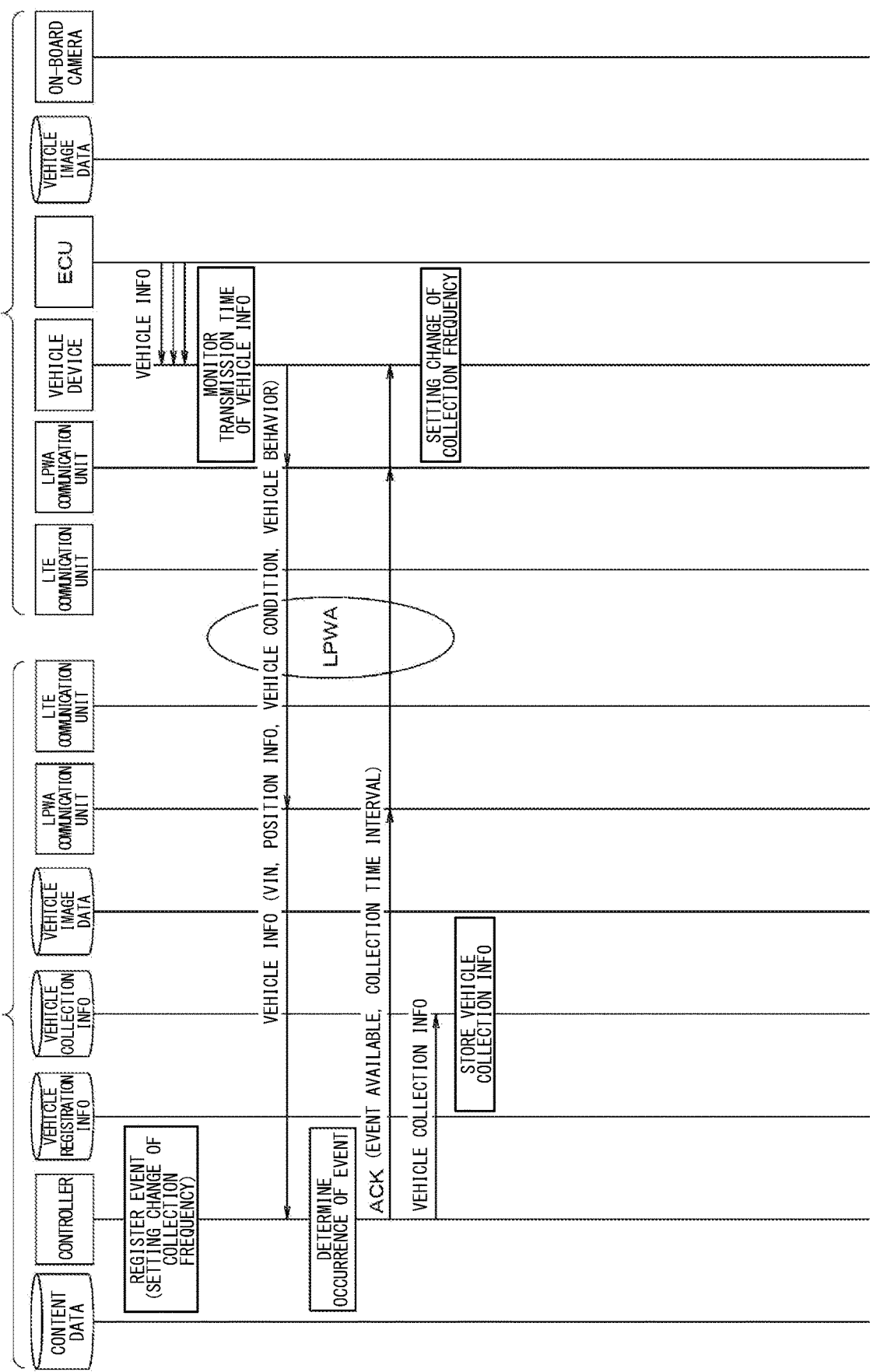
FIG. 9 is a sequence diagram of setting change of collection frequency.

As shown in FIG. 9, in the center device 2, the controller 20 determines an occurrence of an event related to the VIN included in the received vehicle information. In response to the controller 20 determining an event of setting change of the collection frequency, the controller 20 sets the event occurrence flag to "YES", and transmits an ACK including "event available" and collection time interval indicating the collection frequency after the setting change from the LPWA communication unit 21 to the vehicle device 10 via the communication network 5. After the controller 20 completes the transmission of ACK, the controller 20 stores the received vehicle information as the vehicle collection information in the vehicle collection information database 25.

In the vehicle system 3, in response to the vehicle device 10 receiving the ACK transmitted from the center device 2 via the LPWA communication unit 13, the vehicle device 10 specifies the collection time interval included in the received ACK and changes the setting of current transmission cycle of the vehicle information according to the specified collection time interval. Then, the vehicle device 10 transmits the vehicle information from the LPWA communication unit 13 to the center device 2 via the communication network 5 according to the transmission cycle to which the setting change is applied.

(4) Distribution of Content Data

Figure 10:
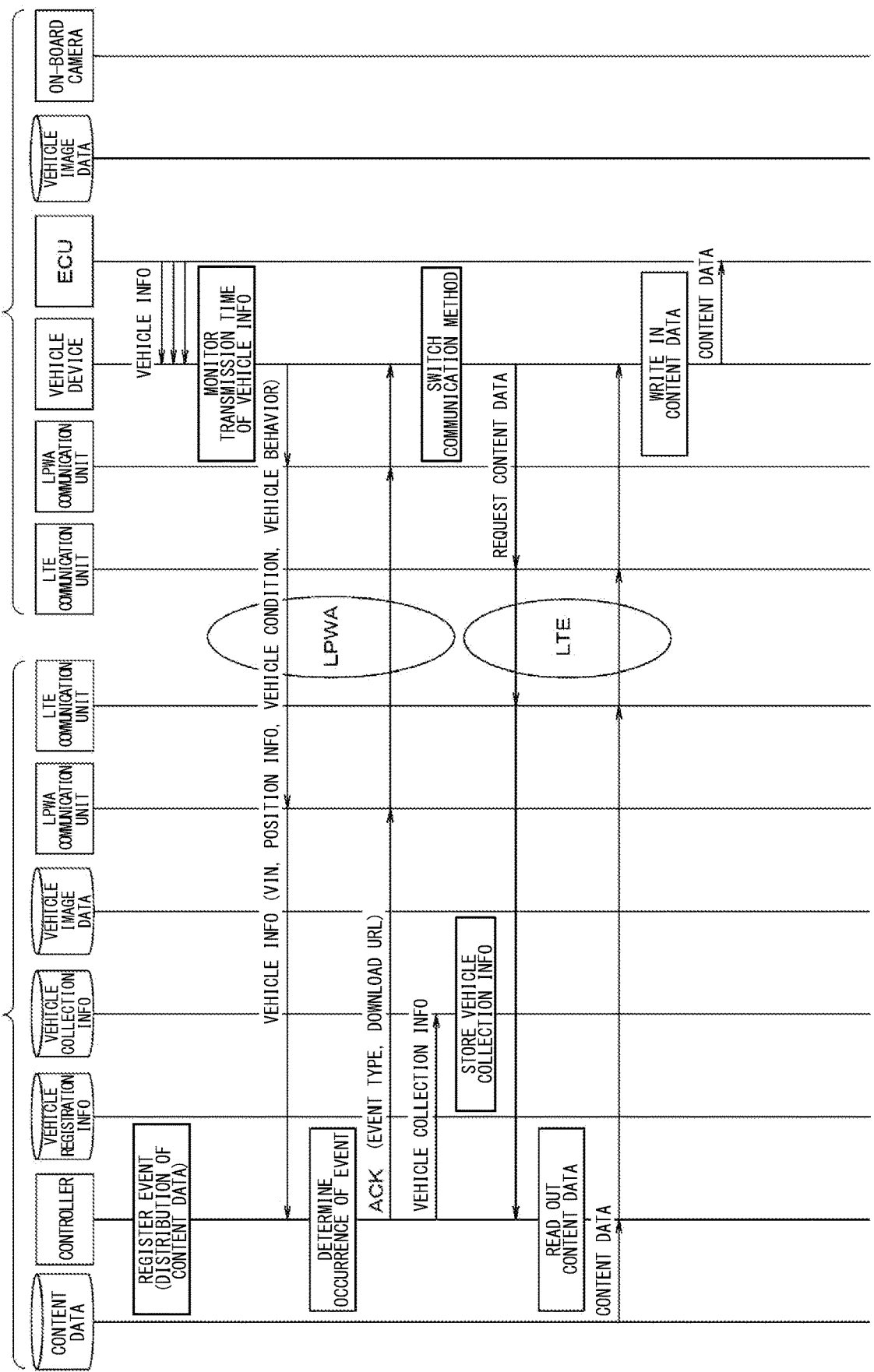
FIG. 10 is a sequence diagram of distribution of content data.
Figure 11:
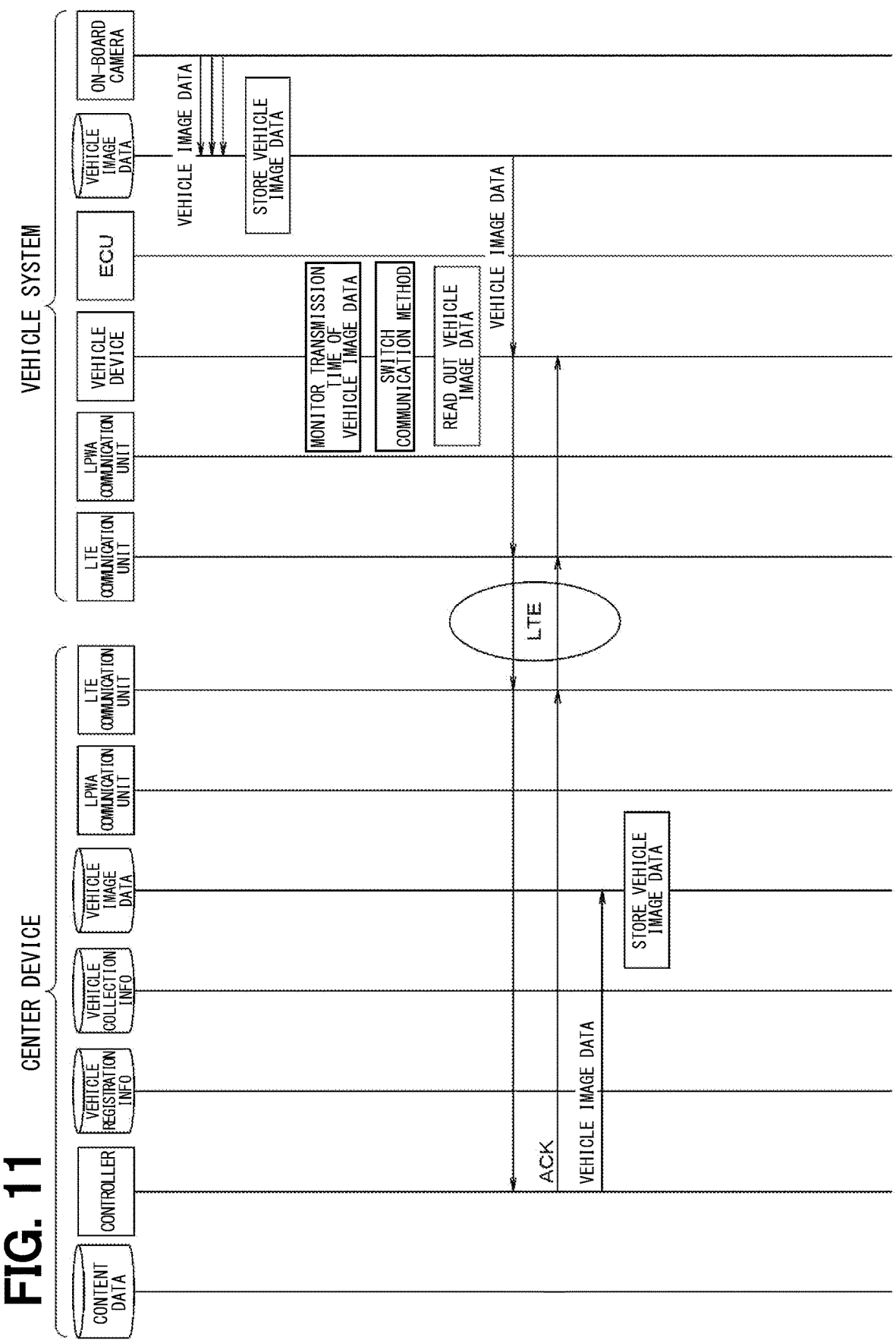
FIG. 11 is a sequence diagram of transmission of vehicle image data.

As shown in FIG. 10, in the center device 2, the controller 20 determines an occurrence of an event related to the VIN included in the received vehicle information. In response to the controller 20 determining an event of content data distribution, the controller 20 sets the event occurrence flag to "YES", and transmits an ACK including an event type and a download URL from the LPWA communication unit 21 to the vehicle device 10 via the communication network 5. After the controller 20 completes the transmission of ACK, the controller 20 stores the received vehicle information as the vehicle collection information in the vehicle collection information database 25.

In the vehicle system 3, in response to the vehicle device 10 receiving the ACK transmitted from the center device 2 by the LPWA communication unit 13, the vehicle device 10 specifies the event type and the download URL included in the received ACK, and switches the communication method to be used from the LPWA communication to the LTE communication. The vehicle device 10 transmits a content request from the LTE communication unit 14 to the center device 2 via the communication network 5.

In the center device 2, in response to the controller 20 receiving the content request transmitted from the vehicle device 10 by the LTE communication unit 22, the controller 20 reads out, from the content data database 23, the content data corresponding to the event type. Then, the controller 20 distributes the readout content data from the LTE communication unit 22 to the vehicle device 10 via the communication network 5 (content data distribution procedure).

In the vehicle system 3, in response to the vehicle device 10 receiving the content data distributed from the center device 2 by the LTE communication unit 14, the vehicle device 10 writes the received content data into the corresponding ECU 16. In a case where the content data is the reprogramming data, the vehicle device 10 repairs the bug of the application program or improves the function of application program by writing the reprogramming data into the corresponding ECU 16. In a case where the content data is the map data, the vehicle device 10 updates the map data used in the application program by writing the map data into the corresponding ECU 16.

(5) Transmission of Vehicle Image Data

In the vehicle system 3, in response to the vehicle device 10 receiving the vehicle image data from the on-board camera 18, the vehicle device 10 temporarily stores the received vehicle image data in the vehicle image data storage 19, and determines whether a preset transmission time of the vehicle image data has been reached. In response to the vehicle device 10 determining that a vehicle image data transmission condition is satisfied and the transmission time of the vehicle image data has been reached, the vehicle device 10 switches the communication method from the LPWA communication to the LTE communication. The vehicle device 10 reads out the vehicle image data from the vehicle image data storage 19, and transmits the readout vehicle image data from the LTE communication unit 14 to the center device 2 via the communication network 5.

In the center device 2, in response to the controller 20 receiving the vehicle image data transmitted from the vehicle device 10 by the LTE communication unit 22, the controller 20 transmits an ACK from the LTE communication unit 22 to the vehicle device 10 via the communication network 5. After the controller 20 completes the transmission of ACK, the controller 20 stores the received vehicle image data in the vehicle image data database 26.

In the above configuration, the controller 20 may determine the current position of the vehicle and the remaining battery amount of a vehicle-mounted battery, and may determine whether to distribute the content data or not. The controller 20 may be configured to distribute the content data to the vehicle which is currently positioned within a predetermined area, and not distribute the content data to the vehicle which is currently positioned out of the predetermined area. For example, the predetermined area may be an area where the radio wave environment is in good condition and unauthorized data communication does not occur. The controller 20 may determine whether the current position of the vehicle is within the predetermined area. In response to the controller 20 determining that the current position of the vehicle is within an area where the radio wave environment is not in good condition or unauthorized data communication frequently occurs, the controller 20 specifies that a communication security cannot be ensured and a risk, such as data falsification may occur. In this case, the controller 20 may cancel the distribution of the content data.

The controller 20 may be configured to distribute the content data to the vehicle which has the remaining battery amount equal to or greater than a threshold value, and not distribute the content data to the vehicle which has the remaining battery amount less than the threshold value. For example, the threshold value may be set to a value sufficiently greater than an estimated consumption power that is expected to be consumed for normally completing the distribution of the content data. The controller 20 may be configured to determine whether the remaining battery amount is equal to or greater than the threshold value. For example, when the controller 20 determines that the remaining battery amount may run out if the distribution of the content data is started, the controller 20 predicts a possibility that the distribution of content data cannot be completed normally even though the distribution is started. In this case, the controller 20 may cancel the distribution of the content data. The controller 20 may set the threshold value according to the data amount of the content data. When the data amount of the content data is relatively large, the threshold value may be set relatively high. When the data amount of the content data is relatively small, the threshold value may be set relatively low.

The present embodiment as described above provides the following technical effects.

In the center device 2, the vehicle information is received from the vehicle by the LPWA communication method, which has a relatively slow communication speed but a relatively wide communication range. The content data is distributed to the vehicle by the LTE communication method, which has a relatively narrow communication range but a relatively high communication speed. The vehicle information requires frequent communication over a wide area in order to keep the latest vehicle information. By collecting the vehicle information by the LPWA communication method, it is possible to keep the latest vehicle information. The content data requires large communication capacity in order to avoid increase of communication time period. By distributing the content data by the LTE communication method, the content data can be distributed in a short time. With this configuration, vehicle information can be efficiently collected from the vehicle, and the content data suitable for the latest vehicle information can be efficiently distributed to the vehicle.

In response to detecting an occurrence of a collection frequency setting change event, the center device 2 receives the vehicle information according to the collection frequency to which the setting change is applied. For example, when the processing load of the center device 2 is relatively high, the collection frequency may be set relatively long, and when the processing load of the center device 2 is relatively low, the collection frequency may set relatively short. With this configuration, the vehicle information can be efficiently collected from the vehicle without affecting the function of the center device 2.

In response to detecting the occurrence of the content data distribution event, the center device 2 distributes the content data. The center device 2 manages the content data distribution event and generates the distribution event. Thus, the center device 2 can have the initiative in distributing of the content data.

In the center device 2, the vehicle information is received from the vehicle by the cellular LPWA communication method, and the content data is distributed to the vehicle by the LTE communication method. Thus, seamless communication control can be executed without wireless connection interruption. When non-cellular LPWA communication method is adopted, the vehicle positioned within the communication range of the LTE communication method may be out of the communication range of the non-cellular LPWA. By adopting the cellular LPWA communication method, the vehicle positioned within the communication range of the LTE communication method can be ensured to be within the communication range of the cellular LPWA. Thus, seamless communication control can be executed without wireless connection interruption.

The center device 2 is configured to distribute the content data to the vehicle which is currently positioned within the predetermined area, and not distribute the content data to the vehicle which is currently positioned out of the predetermined area. For example, the vehicle positioned in an area which has poor radio wave environment condition or an area where unauthorized data communication occurs frequently can be excluded from the distribution target of the content data. Thus, it is possible to avoid the problem, such as occurrence of data alteration in advance.

The center device 2 is configured to distribute the content data to the vehicle which has the remaining battery amount of the vehicle battery equal to or greater than the threshold value, and not distribute the content data to the vehicle which has the remaining battery amount less than the threshold value. With this configuration, when a vehicle has a battery remaining amount which cannot secure sufficient power consumption from the start of distribution of content data to the normal completion of the distribution of content data, the vehicle can be excluded from the distribution target of the content data. Thus, after start of the content data distribution, a case where the distribution fails to normally complete due to the insufficient battery remaining amount can be avoided in advance.

While the present disclosure has been described based on the embodiment, the present disclosure is not limited to the embodiment or structure described herein. The present disclosure incorporates various modifications and variations within the scope of equivalents. Additionally, various combinations and configurations, as well as other combinations and configurations including more, less, or only a single element, are within the scope and spirit of the present disclosure.

In the foregoing embodiment, the center device 2 and the vehicle device 10 perform data communication using the LPWA communication method and the LTE communication method. Alternatively, the center device 2 and the vehicle device 10 may perform data communication using another communication method. For example, the center device 2 and the vehicle device 10 may be configured to perform data communication via a communication network including WiFi (Wireless Fidelity) (registered trademark).

The vehicle registration information and the vehicle collection information may include information items other than the examples described above and shown in the drawings.

The information distributed from the center device 2 to the vehicle system 3 may be data other than the reprogramming data or the map data. The information transmitted from the vehicle system 3 to the center device 2 may be other data different from the vehicle image data.

The controller and method described in the present disclosure may be implemented by a special purpose computer which includes a memory and a processor programmed to execute one or more functions embodied in computer programs of the memory. Alternatively, the controller and method described in the present disclosure may be implemented by a special purpose computer which includes a processor with one or more dedicated hardware logic circuits. Alternatively, the controller and method described in the present disclosure may be implemented by one or more special purpose computers, which is configured as a combination of a processor and a memory, which are programmed to perform one or more functions, and a processor which is configured with one or more hardware logic circuits. The computer program may also be stored in a computer readable non-transitory tangible storage medium as instructions to be executed by a computer.

The invention claimed is:

1. A center device comprising:
   a first wireless communication unit configured to wirelessly communicate with a vehicle using a first communication method within a first communication range;
   a second wireless communication unit configured to wirelessly communicate with the vehicle using a second communication method within a second communication range which is smaller than the first communication range, the second communication method having a communication speed higher than a communication speed of the first communication method;
   a reception control unit configured to control a reception of vehicle information communicated from the vehicle to the first wireless communication unit using the first communication method; and
   a distribution control unit configured to control a distribution of content data communicated from the second wireless communication unit to the vehicle using the second communication method in accordance with the received vehicle information;
   wherein the content data includes reprogramming data that updates an application program of an electronic control device of the vehicle.

2. The center device according to claim 1, further comprising
   a setting change event detection unit configured to detect an occurrence of a setting change event of collection frequency,
   wherein the reception control unit receives the vehicle information according to a collection frequency to which a setting change is applied in response to the setting change event detection unit detecting the occurrence of the setting change event of collection frequency.

3. The center device according to claim 1, further comprising
   a distribution event detection unit configured to detect an occurrence of a content data distribution event,
   wherein the distribution control unit distributes the content data in response to the distribution event detection unit detecting the occurrence of the content data distribution event.

4. The center device according to claim 1, wherein
   the first wireless communication unit performs, as the first communication method, a wireless communication compliant with a cellular low power wide area (LPWA) communication method, and
   the second wireless communication unit performs, as the second communication method, a wireless communication compliant with a long term evolution (LTE) communication method.

5. The center device according to claim 1, wherein
   the distribution control unit distributes the content data to the vehicle in a case where the vehicle is currently positioned within a predetermined area, and
   the distribution control unit does not distribute the content data to the vehicle in a case where the vehicle is currently positioned out of the predetermined area.

6. The center device according to claim 1, wherein
   the distribution control unit distributes the content data to the vehicle in a case where the vehicle has a remaining battery amount of a vehicle battery equal to or greater than a threshold value, and
   the distribution control unit does not distribute the content data to the vehicle in a case where the vehicle has the remaining battery amount of the vehicle battery less than the threshold value.

7. The center device according to claim 1, wherein
   the distribution control unit controls, as the distribution of the content data, a distribution of map data.

8. A data communication system comprising:
   the center device according to claim 1; and
   a vehicle device that transmits vehicle information to the center device and receives the content data from the center device.

9. A data communication program product, which is stored in a tangible non-transitory computer-readable storage medium and comprising instructions to be executed by a center device, the instructions comprising:
receiving, using a first wireless communication unit, vehicle information from a vehicle, the first wireless communication unit performing wireless communication with the vehicle by a first communication method within a first communication range;
distributing, using a second wireless communication unit, content data to the vehicle, the second wireless communication unit performing wireless communication, at a higher communication speed than a communication speed of the first communication method, with the vehicle by a second communication method within a second communication range which is smaller than the first communication range; and
controlling, using a distribution control unit, as the distributing of the content data communicated from the second wireless communication unit to the vehicle using the second communication method and in accordance with the vehicle information communicated from the vehicle to the first wireless communication unit using the first communication method, a distribution of reprogramming data that updates an application program of an electronic control device of the vehicle.

10. A center device comprising:
a processor configured to wirelessly communicate with a vehicle using a first communication method within a first communication range and wirelessly communicate with the vehicle using a second communication method within a second communication range; and
a memory,
wherein
the second communication range has a higher communication speed than a communication speed of the first communication range,
the second communication range is smaller than the first communication range, and
the processor is further configured to:
control a reception of vehicle information communicated from the vehicle using the first communication method and store the received vehicle information in the memory; and
control a distribution of content data communicated to the vehicle using the second communication method in accordance with the vehicle information stored in the memory; and
wherein the content data includes reprogramming data that updates an application program of an electronic control device of the vehicle.

11. A center device comprising:
a first wireless communication unit configured to wirelessly communicate with a vehicle using a first communication method within a first communication range;
a second wireless communication unit configured to wirelessly communicate with the vehicle using a second communication method within a second communication range which is smaller than the first communication range, the second communication method having a communication speed higher than a communication speed of the first communication method;
a reception control unit configured to control a reception of vehicle information from the vehicle to the first wireless communication unit;
a distribution control unit configured to control a distribution of content data from the second wireless communication unit to the vehicle in accordance with the received vehicle information; and
a setting change event detection unit configured to detect an occurrence of a setting change event of a collection frequency;
wherein the reception control unit receives the vehicle information according to the collection frequency to which a setting change is applied in response to the setting change event detection unit detecting the occurrence of the setting change event of collection frequency.

12. A center device comprising:
a first wireless communication unit configured to wirelessly communicate with a vehicle using a first communication method within a first communication range;
a second wireless communication unit configured to wirelessly communicate with the vehicle using a second communication method within a second communication range which is smaller than the first communication range, the second communication method having a communication speed higher than a communication speed of the first communication method;
a reception control unit configured to control a reception of vehicle information from the vehicle to the first wireless communication unit;
a distribution control unit configured to control a distribution of content data from the second wireless communication unit to the vehicle in accordance with the received vehicle information; and
a distribution event detection unit configured to detect an occurrence of a content data distribution event;
wherein the distribution control unit distributes the content data in response to the distribution event detection unit detecting the occurrence of the content data distribution event.

* * * * *